April 14, 1964
J. H. DAVIS ETAL
3,128,813
FASTENING DEVICE
Filed Oct. 28, 1960
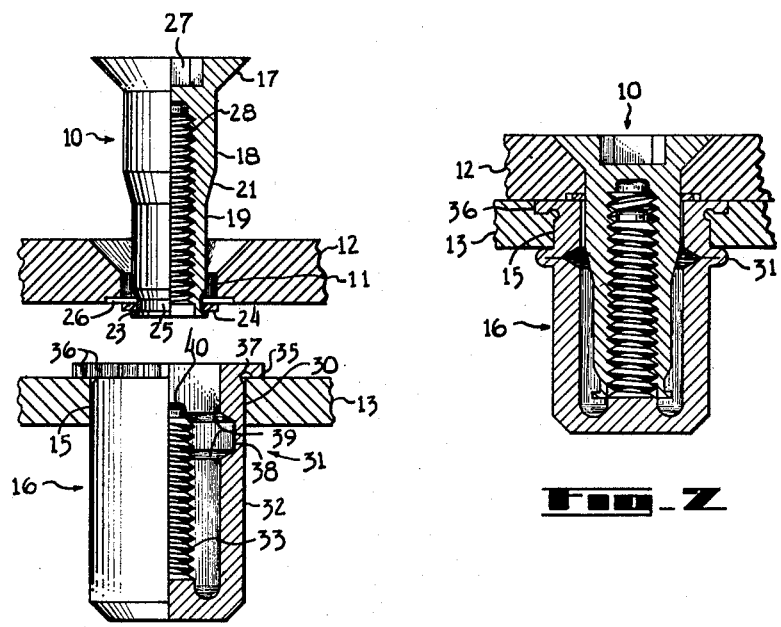
Fig_1
Fig_2
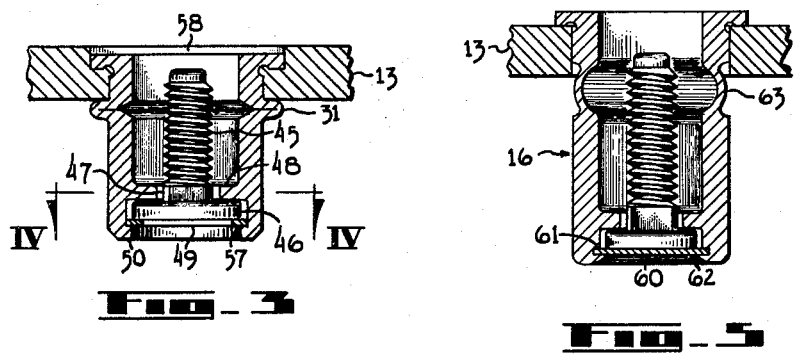
Fig_3
Fig_5
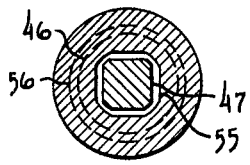
Fig_4
INVENTORS
JOHN H. DAVIS
WALLACE F. HARBISON
BY
ATTORNEY

United States Patent Office 3,128,813
Patented Apr. 14, 1964

3,128,813
FASTENING DEVICE
John H. Davis and Wallace F. Harbison, Fort Worth, Tex., assignors to General Dynamics Corporation, San Diego, Calif., a corporation of Delaware
Filed Oct. 28, 1960, Ser. No. 65,681
2 Claims. (Cl. 151—41.72)

The present invention relates generally to fastening devices, and more particularly, to a combination of fastening elements which is particularly adapted for blind installation and relative lateral movement of such elements to compensate for hole misalignment.

At the present time the most efficient airframe design for aircraft and missiles involves the use of bonded or brazed, honeycomb cored panels attached over a relatively lightweight understructure of longerons, bulkheads, spars, etc. In addition to furnishing an aerodynamically smooth covering for the airframe, such panels also carry a large portion of the static and aerodynamic loads to which the airframe is subjected. Certain of these panels at designated locations must be made removable in order to provide access to internal equipment for purposes of ground servicing and checkout. Upon removal of such a panel the load which is normally carried thereby is transmitted to the adjacent understructure, generally causing deflection thereof. As the fasteners which attach the panel to the understructure are removed, those as yet unremoved are subjected progressively to higher residual shear loads, thus making their removal more difficult. Since the understructure has been deflected by the panel removal, the hole pattern therein has been modified. To make matters worse, removal of the panel generally results in the panel also undergoing a deflection with a proportional change in its hole pattern. The combination of these two factors in most instances renders the misalignment of the respective hole patterns so severe as to make it extremely difficult, if not altogether impossible, to reinstall the panel properly using conventional fasteners.

Certain other difficulties often arise from the use of structural panels. It is desirable initially to align the hole patterns as precisely as possible. This is preferably accomplished by drilling the hole pattern in the panel, positioning the panel upon the understructure, stressing it to stimulate actual operational stresses, locating the hole pattern on the understructure by means of the panel hole pattern, removing the panel and drilling the holes, thus located, in the understructure. The holes are then adapted to receive and engage a fastener. Although in most instances either tapping or nut plates may be employed for this purpose, it frequently occurs that the understructure is too thin for tapping and that access may not be had to the back side of the understructure, so that the rivets which attach the nut plate cannot be installed. In such instances it is necessary to use a fastening element which may be installed from the outer face of the understructure.

Since most present day aircraft and missiles are designed such that in certain areas the external covering of the airframe also serves to define a fuel compartment, it is required that the fasteners used to attach a panel to the understructure in these areas be sealed, preferably self-sealing upon installation without the use of sealing compounds.

To be satisfactory in applications such as described above, a fastening device must have a relatively large alignment tolerance such that the fastener elements may be satisfactorily engaged and must be capable of forcing the holes into alignment. In addition it should be adapted for blind installation and be self-sealing when installed. The provision of a fastening device having these characteristics is the purpose of the subject invention.

The fastening device of the present invention consists of two essential parts. a sleeve bolt which is inserted through a panel and a stud nut installed in an understructural member. The sleeve bolt is designed so as to float or move laterally to compensate for hole misalignment and forcibly to realign the holes upon engagement with the stud nut. The stud nut, in one of the two basic configurations to be described, employs a floating stud which, in addition to the floating capability of the sleeve bolt, serves to compensate for a relatively large hole pattern misalignment. The stud nut also has integral means for preventing rotation of the stud, tension pull-out and push-out and for rendering the hole in which it is installed liquid and even air-tight. The stud nut is also adapted for blind installation.

As is apparent from the foregoing, the present fastening device has numerous advantages over fasteners heretofore employed in similar applications. In addition to those already mentioned, the present fastener may be quickly and easily installed, occupies a minimum amount of space on the inside of the understructure and is very lightweight, may be installed in curved or tapered structures, and has exceptionally good strength characteristics.

It is, therefore, the prime object of the invention to provide a fastening device which will compensate for hole misalignment between structures, which is adapted for blind installation, and which is self-sealing when installed.

Another object is the provision of a fastening device of the type described which is simply and quickly installed.

Another object resides in the provision of a fastening device having the above characteristics which is lightweight yet strong.

These and other objects and advantages will be more apparent to those skilled in the art from the following description of the appended drawings wherein:

FIGURE 1 is a half-sectional view of the fastening device prior to final installation of the stud nut in the understructure;

FIGURE 2 is a sectional view of the fastening device as installed and engaged;

FIGURE 3 shows a stud nut in which a floating stud is employed;

FIGURE 4 is a sectional view taken along line IV—IV in FIGURE 3; and

FIGURE 5 is a view, in section, of a modification of the stud nut employing the floating stud.

Referring now to FIGURE 1 of the drawings there is shown a sleeve bolt 10 extending through a countersunk hole 11 in a structural panel 12 which is to be fastened to and in contact with an understructural member 13 through a hole 15 in which a stud nut 16 has been inserted.

The sleeve bolt 10 comprises a countersunk head portion 17, an upper shank portion 18 and a lower shank portion 19. Such shank portions are interconnected by a tapered shoulder 21. At the lower end of the sleeve bolt, there extends about the circumference thereof a flange 23 which serves to prevent the disengagement of a retainer ring 24 from about the sleeve bolt. The shank is undercut immediately above the flange to form a groove 25 within which the retainer ring seats when the sleeve bolt is in the retracted position as shown. The retainer ring may be of any convenient design, such as spring wire formed into a "star" shape, and is placed around the sleeve bolt after the latter is inserted through the hole 11. Although such a retainer ring is not required for the satisfactory functioning of the present fastening device, it is highly desirable since it prevents misplacement or loss of the sleeve bolt when the panel 12 is removed from the understructure. In order to provide relief for the retainer ring when the two members are pulled together, hole 11 is counterbored at the lower surface of the panel, as indicated at 26.

A driving recess 27 is formed in the head portion of the sleeve bolt. Although the recess shown is Allen wrench actuated, numerous others may be used. About the axis of the bolt are formed internal multilead threads 28. Such threads extend substantially from the lower end of the bolt to a position slightly below the bottom of the driving recess and, as will be seen, serve to engage the stud nut.

The stud nut 16 consists of a head portion 30, an intermediate portion 31, a barrel portion 32, and an axial stud 33. The head is provided with a circumferential collar 35 about the top thereof, such collar having longitudinal serrations or knurls thereon, as indicated at 36. Immediately below the collar, a groove 37 is formed about the head of the stud nut, the purpose of which will be hereinafter more fully explained. The intermediate portion 31 has a wall thickness which is less than the wall thickness of the head and barrel portions. As shown in the present figure, material is removed from the inner wall of the stud nut to form an annular groove having a flat surface 38 and a pair of tapered shoulders 39 interconnecting the groove surface with the inner wall of the stud nut. The angle between the shoulders and the inner wall is important in that, to a large extent, it determines the force necessary to compress the bellows. An angle of approximately sixty degrees is best suited for the practice of the present invention.

The barrel portion 32 of the stud nut is closed at the bottom and is chamfered to facilitate insertion into a hole. The stud 33 extends upward from the bottom of the barrel portion along the axis thereof. The top portion 40 of stud 33 is left unthreaded in order to prevent cross-threading. While the stud is shown as being integral with the barrel, it is to be understood that such stud may be separate from the barrel and assembled therewith as by crimping, welding, etc.

To install the stud nut in a hole through a structural member, the stud 33 is first threaded into the plunger of a hydraulically or pneumatically operated tool (not shown) adapted to exert a pull upon the nut. The stud nut is next inserted into the hole such that the collar 35 rests upon the structural member. Then the tool is actuated causing a force or pressure to be applied which initiates the collapse of the intermediate portion 31. As such portion collapses, it expands to form a ring about the stud nut immediately adjacent the underside of the structural member and thus prevents the nut from being pulled out of the hole. An equal but oppositely directed pressure is applied on the top surface of collar 35 which drives same into the upper face of structure 13. As the collar is driven further into the structure, more of the intermediate portion drops below the level of the structure's lower surface, thus exposing it to the compressive-expansive pressure of the tool, which results in further compression and expansion of the intermediate portion. When the collar is driven into the structure to a position where their respective top surfaces are flush and the intermediate portion is fully compressed, the pressure is relieved and the tool is disengaged from the stud.

As the stud nut is installed in a structure, the material which is displaced by the collar flows between the serrations and into the groove 37 around the head, thus preventing the formation of an undesirable ridge thereabout.

The panel 12 may then be placed over the understructure 13, the sleeve bolt engaged with the stud nut and tightened, thereby pulling the two structures together as shown in FIGURE 2. The lengths of lower shank portion 19 of sleeve bolt 10 and of stud 33 of stud nut 16 are adjusted such that in a particular application the sleeve bolt engages several threads of the stud before the tapered shoulder of the former enters the portion of the hole 11 through panel 12 which is below the countersink. Since the lower shank portion is of a diameter smaller than that of hole 11, such a provision makes it possible for the sleeve bolt to engage the stud, even though the respective holes in the structures are slightly misaligned, by permitting the sleeve bolt to float or move laterally within its hole. Tightening of the sleeve bolt causes the tapered shoulder to enter the lower portion of hole 11 and jack its way therethrough, thus forcing the holes into alignment.

The intermediate portion 31, thus expanded, forms a ring about the stud nut 16 at the lower surface of the understructure which serves to lock the stud nut in place against tension pull-out, as when the sleeve bolt 10 is engaged therewith and tightened. During such tightening rotation and push-out of the stud-nut are prevented by knurls 36 on collar 35.

Referring now to FIGURES 3 and 4, there is shown a modification of the stud nut in which provision is made for the lateral movement of the stud. This type stud nut is highly advantageous in applications wherein the problem of relatively large hole misalignment between the understructure 13 and other structural members which are to be fastened thereto is encountered. The stud 33 in this adaptation is separate from the barrel 32 and consists of a threaded shaft 45, a circular base 46 and an unthreaded intermediate section 47. The stud is retained in the barrel by means of a flange 48 intermediate the ends of the barrel and extending inwardly from the inner wall thereof above the base 46 of the stud, and by means of a snap ring 49 which overlaps and seats upon another inwardly extending flange 50 at the lower end of the barrel.

The intermediate flange 48 is apertured as at 55 (FIGure 4) to permit the passage of the stud therethrough. Such aperture, while being essentially square, is preferably formed with rounded corners. The intermediate section 47 of the stud, which is adjacent the flange 48, while having a cross-section which is of the same general shape as the aperture 55, is of somewhat smaller dimension than the latter so as to permit lateral movement or floating of the stud. In order to prevent continuous rotation of the stud during tightening of a sleeve bolt thereon, stud section 47 is made such that the diagonal dimension thereof is greater than the shortest dimension across the aperture 55. Thus as the sleeve bolt is tightened upon the stud, rotation of the latter is prevented by the corners of stud intermediate section 47 interfering with the walls of the aperture 55.

There is also clearance between the base 46 of the stud and the barrel inner wall 56 adjacent thereto. Thus as a sleeve bolt is engaged with the stud 33, such stud will move laterally in relation to the barrel to align itself with the sleeve bolt. The lengths of the stud and sleeve bolt are adjusted as explained above such that with the floating stud of the present adaptation, in addition to the lateral movement of which the sleeve bolt is capable, a relatively large initial misalignment between the panel and understructure hole patterns may be tolerated.

Since the barrel and stud in the present modification of the fastening device are separate and must be assembled, the diameter of the aperture 57 through lower flange 50 is slightly larger than that of the stud base 46. Assembly is accomplished by inserting the threaded section 45 through the apertures 57 and 55 in flanges 50 and 48, respectively, until the top surface of stud base 46 contacts the lower surface of intermediate flange 48. The snap ring 49 is then compressed, inserted through the lower flange and allowed to expand on the upper surface thereof immediately beneath the stud base 46.

Also shown in FIGURE 3 is an alternative provision of the recess for the sleeve bolt retainer ring. Rather than having the recess on the underside of the panel, as described above, it may be formed on the upper surface of the understructure, as indicated at 58.

In areas where a floating stud nut is required, and also where sealing is required, as in aircraft wings having integral fuel cells to which access must be had through stressed panels, the stud nut shown in FIGURE 5 may be used to advantage. A stud, such as was described in conjunction with FIGURES 3 and 4, is also employed in this stud nut configuration. However, rather than using a snap ring to retain the stud in the barrel, a solid, circular tab 60 is employed. The barrel 32 is made as before with the exception that instead of having a flange at the lower end thereof, an internal step 61 and a clinch lip 62, initially open, are formed thereon. After assembly of the stud with the barrel, the tab 60 is positioned on the step 61.

The lip is then folded over to retain the tab in place and thus forms a fluidtight seal therebetween.

Also illustrated in FIGURE 5 is a variation in the intermediate portion of the stud nut which may be employed on any of the stud nut configurations described above. To obtain this type of intermediate portion, material is removed from the exterior surface of the barrel to form a groove thereabout. The material adjacent the groove is then bowed or bulged outwardly until the diameter thereof is equal to, or slightly less than, that of the remainder of the barrel. This bowed configuration 63 assures that the intermediate portion will expand outwardly during compression of the stud nut to form an annular locking ring on the underside of the structure through which the stud nut is installed.

As thus described the present invention is characterized as a novel combination of fastening elements including an internally threaded sleeve bolt, the shank of which has at least two portions, one of which is of smaller diameter than the other, interconnected by a tapered shoulder; and also including a stud nut having an externally knurled head portion, a compressible and expansible intermediate portion, a barrel portion and an externally threaded, axial stud which engages the sleeve bolt.

Although only certain specific embodiments of the invention have been herein illustrated and described, it is to be understood that the invention is not limited thereto, as many variations and modifications will be apparent to those skilled in the art, and the invention is to be given the broadest possible interpretation within the terms of the following claims.

We claim:

1. A composite fastening device for attaching a panel to an understructure comprising a stud nut for installation in a hole in said understructure, a sleeve bolt for insertion through a hole in said panel, and a retainer ring disposed about said sleeve bolt to retain same in said panel, said stud nut including a head portion having an integral, longitudinally serrated collar thereabout and a groove around said head portion below said collar for forced engagement with said understructure to embed said collar into said understructure flush therewith and to prevent rotation of said stud nut, said stud nut having a barrel portion and a portion intermediate said head and barrel portions, the wall thickness of said intermediate portion being less than the wall thickness of said head and barrel portions to facilitate expansion of said intermediate portion on the underside of said understructure to form an integral tension locking ring, and an externally threaded stud positioned within said barrel portion and connected thereto, said sleeve bolt including a head provided with driving means, a flange extending outwardly from the end of said sleeve bolt opposite said head to prevent the disengagement of said retainer ring, a first shank portion adjacent said head, a second shank portion of smaller diameter than said first shank portion, and a tapered shoulder interconnecting said shank portions whereby the holes in said panel and understructure are forced into alignment as said sleeve bolt is tightened on said threaded stud.

2. A composite fastening device for attaching a stressed panel to an understructure comprising a stud nut for installation in a hole in said understructure and a sleeve bolt for insertion through a hole in said panel, said stud nut including a stud, a barrel portion, a head portion, and an intermediate portion, said stud comprising a threaded shaft positioned in said barrel, a circular base positioned between an upper flange and a lower flange, said flanges extending inwardly from the inner wall of said barrel, said upper flange having a central, substantially square opening therethrough to permit the passage of said shaft and to engage a substantially square portion of said shaft to prevent rotation thereof during tightening of said sleeve bolt, the size of said barrel inner wall diameter and said square opening being larger than the size of said circular base and said rectangular shaft portion, respectively, to permit lateral movement of said stud in order to compensate for misalignment of the holes in said panel and understructure, said intermediate portion being integral with said barrel portion and having a wall thickness less than said barrel portion whereby said intermediate portion may be expanded on the underside of said understructure to form an integral tension locking ring, said head portion being integral with said intermediate portion and having thereabout a collar longitudinally serrated and a groove around said head portion below said collar for forced engagement with said understructure to embed said collar into said understructure flush therewith and to prevent rotation of said stud nut, said sleeve bolt having means to forcibly align the holes in said panel and understructure, a head provided with driving means, and a shank internally threaded to engage said threaded shaft.

References Cited in the file of this patent

UNITED STATES PATENTS

| | | |
|---|---|---|
| 2,018,251 | Croessant | Oct. 22, 1935 |
| 2,553,236 | Bratfisch | May 15, 1951 |
| 2,670,021 | Torresen et al. | Feb. 23, 1954 |
| 2,685,320 | Rosan | Aug. 3, 1954 |
| 2,737,222 | Becker | Mar. 6, 1956 |
| 2,914,106 | Boyd | Nov. 24, 1959 |
| 2,991,816 | Harbison et al. | July 11, 1961 |

FOREIGN PATENTS

| | | |
|---|---|---|
| 737,284 | France | Oct. 3, 1932 |
| 982,415 | France | Jan. 31, 1951 |
| 773,814 | Great Britain | May 1, 1957 |